United States Patent
Kamath et al.

(10) Patent No.: US 9,036,200 B2
(45) Date of Patent: May 19, 2015

(54) JOB PROCESSING BY DIVIDING A JOB INTO SUB-JOBS FOR RENDERING AND STREAMING

(75) Inventors: Harish B Kamath, Bangalore (IN); Rajesh Bhatia, Bangalore (IN); Ramesh Kavanappillil, Bangalore (IN); Sanjay Kumar, Bangalore (IN); Senthil Kumar Venkatesh, Bangalore (IN); Shinoj Prabhakaran, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1223 days.

(21) Appl. No.: 12/881,784

(22) Filed: Sep. 14, 2010

(65) Prior Publication Data

US 2012/0062935 A1 Mar. 15, 2012

(51) Int. Cl.
*G06F 15/00* (2006.01)
*G06F 3/12* (2006.01)
*G06K 15/02* (2006.01)
*H04N 1/00* (2006.01)

(52) U.S. Cl.
CPC .............. *G06F 3/1288* (2013.01); *G06K 15/02* (2013.01); *H04N 1/00957* (2013.01); *G06F 3/1258* (2013.01); *G06F 3/1212* (2013.01); *G06F 3/1247* (2013.01); *G06F 2206/1514* (2013.01)

(58) Field of Classification Search
USPC ........................................................ 358/1.15
See application file for complete search history.

(56) References Cited

U.S. PATENT DOCUMENTS

| | | | |
|---|---|---|---|
| 5,583,621 A | 12/1996 | Narukawa | |
| 5,663,750 A | 9/1997 | Sakuma | |
| 6,335,795 B1 | 1/2002 | Neuhard et al. | |
| 6,671,066 B1 * | 12/2003 | Aikawa et al. | 358/1.18 |
| 6,894,804 B2 | 5/2005 | Nguyen et al. | |
| 6,924,903 B2 | 8/2005 | Brooks et al. | |
| 7,375,842 B2 | 5/2008 | Kloosterman et al. | |
| 7,679,770 B2 | 3/2010 | Fertlitsch et al. | |
| 8,194,272 B2 | 6/2012 | Yoshizumi et al. | |
| 8,363,255 B2 | 1/2013 | Liu et al. | |
| 8,514,422 B2 | 8/2013 | Kimura | |
| 8,593,653 B2 | 11/2013 | Fujimori et al. | |
| 2002/0034392 A1 * | 3/2002 | Baum et al. | 396/564 |

(Continued)

FOREIGN PATENT DOCUMENTS

EP 1259887 A1 11/2002
EP 2641746 A1 9/2013

(Continued)

OTHER PUBLICATIONS

Crawford, L.S. et al., "Synchronized Control in a Large-Scale Networked Distributed Printing System," (Research paper), 2009 IEEE International Conference on Robotics and Automation, Kobe, Japan, May 12-17, 2009, pp. 158-163.

(Continued)

*Primary Examiner* — Miya J Cato
(74) *Attorney, Agent, or Firm* — Hewlett-Packard Patent Department

(57) ABSTRACT

A job processing method includes dividing a job into sub-jobs. Each sub-job is rendered into a device ready format. A message is communicated to a device. The communicating is timed in accordance with a completion of the rendering of a first of the sub-jobs. Following a receipt of a response to the message from the device, the rendered first sub-job is streamed to the device followed by the remainder of the rendered sub jobs.

26 Claims, 4 Drawing Sheets

(56) References Cited

U.S. PATENT DOCUMENTS

| | | |
|---|---|---|
| 2002/0042884 A1 | 4/2002 | Wu et al. |
| 2004/0015687 A1 | 1/2004 | Chiarabini et al. |
| 2004/0179230 A1 | 9/2004 | Kitada et al. |
| 2004/0197124 A1 | 10/2004 | Klassen |
| 2005/0073705 A1 | 4/2005 | Hall et al. |
| 2006/0227363 A1 | 10/2006 | Ogura |
| 2007/0121144 A1 | 5/2007 | Kato |
| 2007/0247654 A1 | 10/2007 | Tian |
| 2008/0204793 A1 | 8/2008 | Shaw |
| 2009/0179991 A1 | 7/2009 | Mohammad |
| 2009/0251718 A1 | 10/2009 | Khain |
| 2010/0030707 A1 | 2/2010 | Jingu |
| 2010/0053657 A1 | 3/2010 | Weber |
| 2010/0053664 A1* | 3/2010 | Mandel et al. ............... 358/1.15 |
| 2010/0128297 A1* | 5/2010 | Redd et al. .................. 358/1.13 |
| 2010/0188688 A1 | 7/2010 | Selvaraj et al. |
| 2010/0225957 A1 | 9/2010 | Liu |
| 2010/0328703 A1 | 12/2010 | Cain |
| 2011/0019222 A1 | 1/2011 | Tang et al. |
| 2011/0194140 A1* | 8/2011 | Sweet et al. ................. 358/1.15 |
| 2012/0026548 A1 | 2/2012 | Nakagawa |
| 2012/0062935 A1 | 3/2012 | Kamath et al. |
| 2012/0194850 A1 | 8/2012 | K. et al. |
| 2012/0218576 A1 | 8/2012 | Sekine et al. |
| 2012/0314240 A1 | 12/2012 | Randell et al. |
| 2013/0229679 A1 | 9/2013 | Kamath et al. |

FOREIGN PATENT DOCUMENTS

| | | |
|---|---|---|
| FR | 2811458 A1 | 1/2002 |
| JP | 2003260853 A | 9/2003 |
| JP | 2006007487 A | 1/2006 |
| JP | 2006252119 A | 9/2006 |

OTHER PUBLICATIONS

Grundy, J., How to Check Printer Status Using Java, Apr. 16, 2012, 4 pps., http://www.ehow.com/how_7807221_check-printer-status-using-java.html.

Konica Minolta Business Solutions, "Print Pool Manager," (Web Page), retrieved on March 28, 2014 at http://develop.ov4.de/en/products/0/115_produkte-detail.htm?ovs_pm=1.

Obviousidea.Com, "GreenCloud is THE green pdf creator—ink saver driver and word to PDF converted to boost your existing printer!," Aug. 19, 2013, <http://www.obviousidea.com/windows-software/greencloud-printer/>.

* cited by examiner

JOB PROCESSING BY DIVIDING A JOB INTO SUB-JOBS FOR RENDERING AND STREAMING

BACKGROUND

Jobs can be delivered to devices such as printers. Before being produced, the jobs are first rendered into a format compatible with the device. For example, an electronic document to be printed is first converted to a format that can be processed or otherwise interpreted by a printer to produce printed output. For complex jobs, this rendering can take a relatively long time creating a noticeable lag between a when a user submits a job and when the device begins producing the job. The lag can lead to user frustration. User frustration is magnified when the job needs to be resubmitted.

For example, a user might mistakenly submit a complex print job with parameters specifying black and white output when color output is desired. The user waits for the job to be rendered and printing to start before learning of the mistake. After the job is cancelled and resubmitted with the proper color parameters, the user experiences a second lag resulting from the print job being rendered for color output. That second lag is compounded if the print job is no longer at the top of the queue, and the user is forced to wait for any intervening jobs to be printed.

DRAWINGS

DETAILED DESCRIPTION

INTRODUCTION: Various embodiments described below were developed in an effort to reduce the lag between when a job is submitted and when a device begins producing that job. A "job" as used herein refers to data that once rendered into a device ready format can be processed by the device to produce an output. The data includes job parameters for guiding how the job is to be rendered into a device ready format and for guiding how the device ultimately processes the rendered job. Additional embodiments allow job parameters to be modified dynamically without the need to cancel or resubmit a given job.

Where, for example, the device is a printer, the job can be a print job that includes content to be printed as well as print parameters. The content can include any combination of electronic text and images that span one or more pages. The print parameters can specify options such as resolution, color, page ranges to be printed, print media to be used, finishing options, and the like. The print parameters can directly or indirectly identify the printer to which the job is directed. The printer can be directly identified when the print parameters specify the particular printer. The printer can be indirectly identified when the parameters specify printing options that are compatible with the particular printer.

The following description is broken into sections. The first, labeled "Environment," describes an exemplary environment in which various embodiments may be implemented. The second section, labeled "Components," describes examples of various physical and logical components for implementing various embodiments. The third section, labeled as "Operation," describes steps taken to implement various embodiments.

Figure 1:
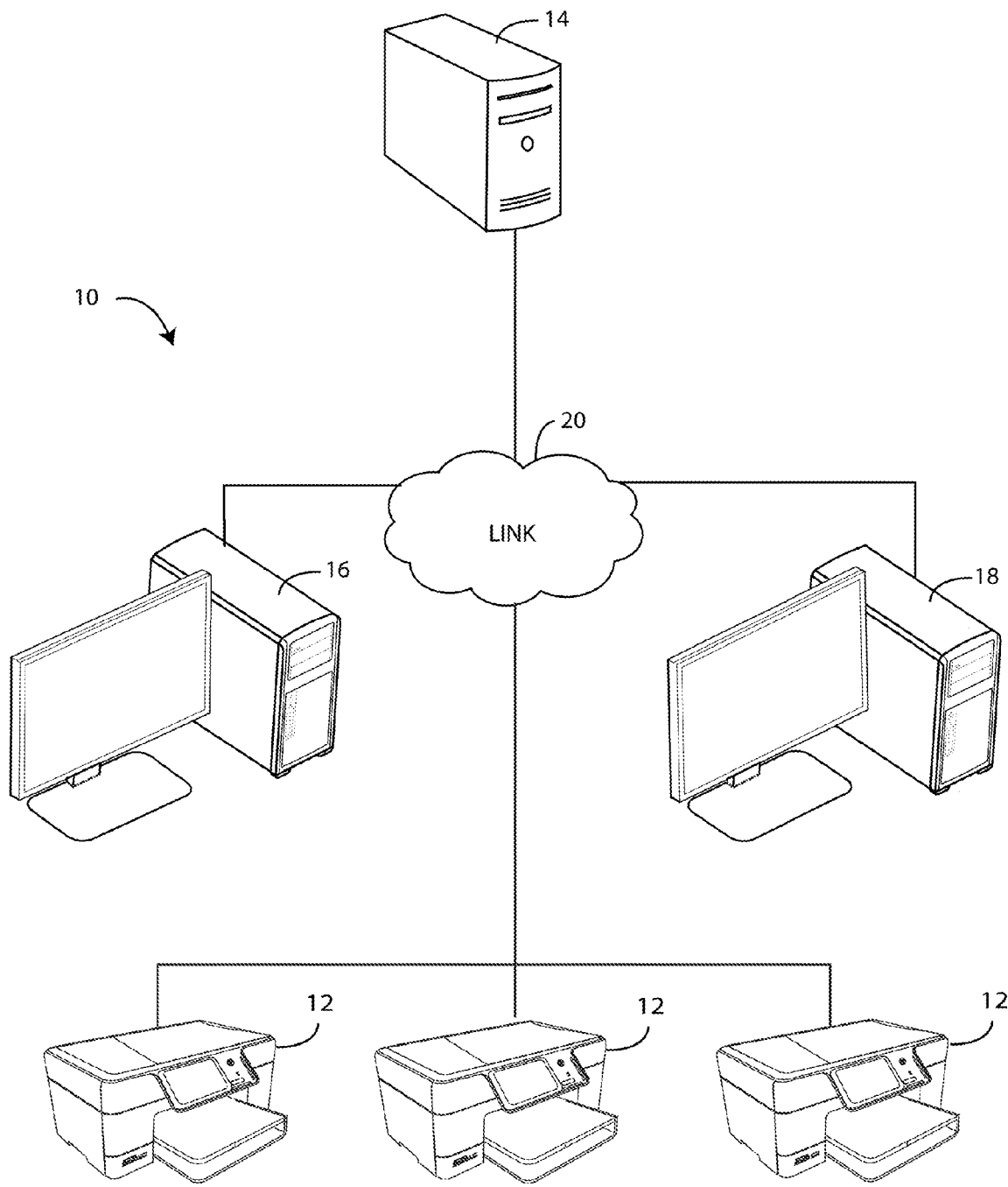
FIG. 1 depicts an exemplary environment in which various embodiments may be implemented.

ENVIRONMENT: FIG. 1 depicts an environment 10 in which various embodiments may be implemented. Environment 10 is shown to include devices 12, job service 14, and clients 16 and 18. While environment 10 is shown to include three printers 12, two clients 16 and 18, and one job service 14, environment 10 may include any number of such components.

Devices 12 each represent generally an apparatus configured to process jobs received from job service 14 to produce an output. In the example of FIG. 1, devices 12 are shown as printers configured to produce printed output from print jobs. Job service 14 represents a network service configured to selectively deliver jobs to devices 12. A network service is a server or collection of servers configured to communicate with a one or more devices to fulfill an intended purpose or purposes. In this case, that intended purpose is to deliver jobs to devices 12. Clients 16 and 18 each represent a computing device configured to interact with and direct job service 14 to cause a job to be delivered to a selected device 12.

In an implementation discussed in more detail below, devices 12 are printers and client devices 16 and 18 are configured to instruct job service 14 to cause printers to produce printed output. In a particular example, a given client 16 or 18 communicates with job service 14 to submit a print job by identifying content to be printed as well as print parameters. Job service 14 renders the job into a format compatible with a selected printer 12 and delivers the rendered job to that printer 12.

Components 12-18 are interconnected via link 20. Link 20 represents generally one or more of a cable, wireless, fiber optic, or remote connections via a telecommunication link, an infrared link, a radio frequency link, or any other connectors or systems that provide electronic communication. Link 20 may include, at least in part, an intranet, the Internet, or a combination of both. Link 20 may also include intermediate proxies, routers, switches, load balancers, and the like. The paths followed by link 20 between components 12-18 as depicted in FIG. 1 represent the logical communication paths between these devices, not necessarily the physical paths between the devices.

Figure 2:
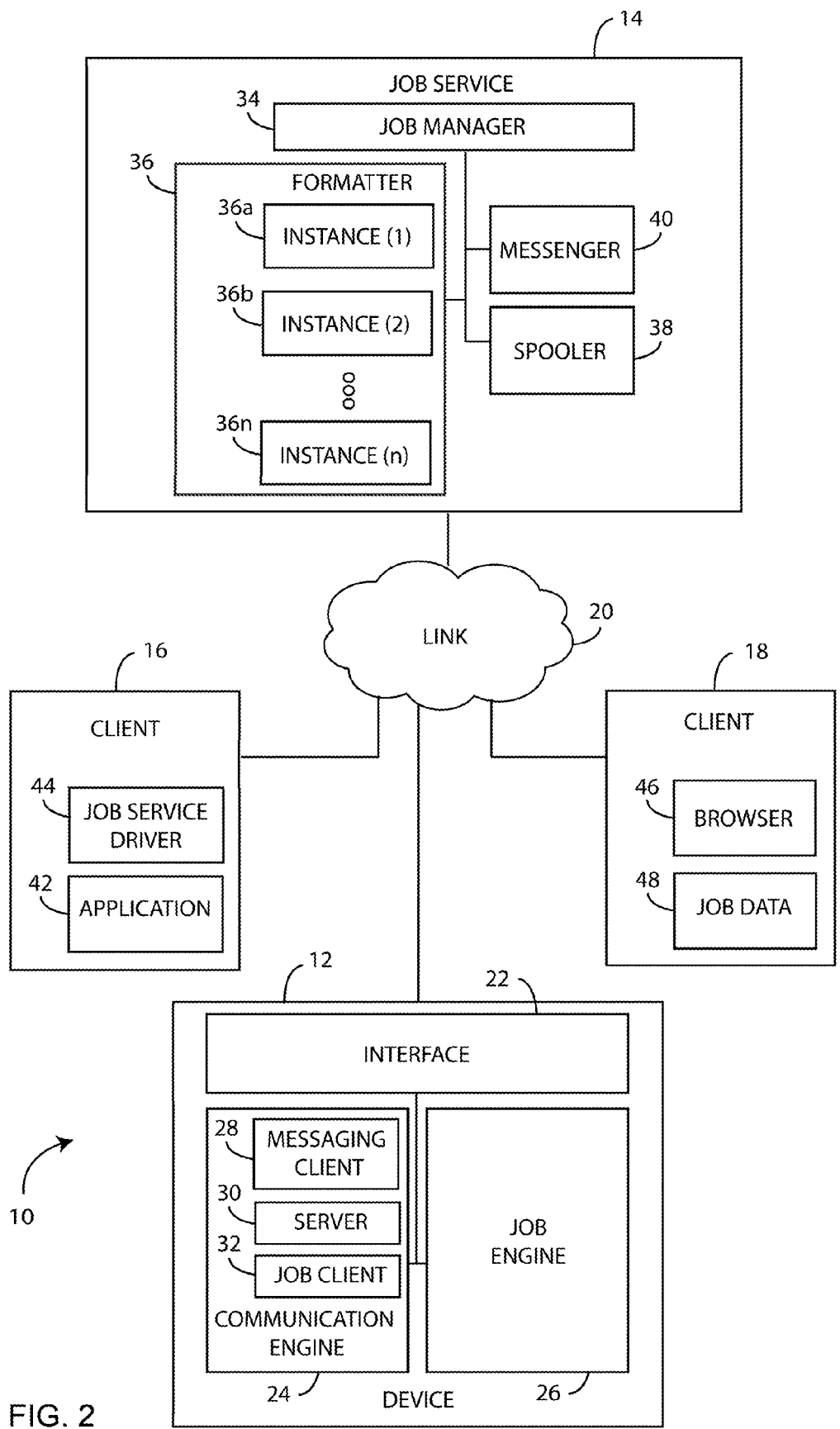
FIG. 2 depicts example and various physical and logical components for implementing various embodiments.

COMPONENTS: FIG. 2 depicts various physical and logical components for implementing various exemplary embodiments. In FIG. 2, device 12 is shown to include interface 22, communication engine 24, and job engine 26. Interface 22 represents generally any combination of hardware and programming configured to receive and pass communications via link 20. In particular, interface 22 may include one or more physical ports such as a wired or wireless network port via which communications may be sent and received on more than one data channel. As discussed below, one such channel may be used for communications of a first protocol such as XMPP (Extensible Messaging and Presence Protocol) and another data channel may be used for communications of a second protocol such as HTTP (Hypertext Transport Protocol).

Communication engine 24 represents generally any combination of hardware and programming configured to process communications received via interface 22 and to generate communications to be sent via interface 22. As addressed in more detail below, communication engine 24 is responsible for processing and generating communications of different types that are received and sent on different channels using different protocols. In particular, through those communications, communication engine 24 is operable to retrieve and pass a rendered job to job engine 26. Job engine 26 represents generally any combination of hardware and programming configured to process a rendered job received from communication engine 24 to achieve an intended result. For example, where device 12 is a printer and the job is a print job, job engine 26 is responsible for processing the print job to produce printed output. In this example, job engine 26 would include components to deposit imaging material such as ink or toner onto print media such as paper sheets.

In FIG. 2, communication engine 24 is shown to include messaging client 28, server 30, and job client 32. Messaging client 28 represents generally any combination of hardware and programming configured to communicate with job service 14 via a messaging channel using a first protocol. In particular, messaging client 28 receives, utilizing the first protocol, a message from messaging service 16, extracts a request from the message, and sends, utilizing a second protocol, the request to server 30. The request includes a job instruction to be processed by server 30. As noted above the first protocol may be XMPP while the second protocol can be HTTP. Messaging client 32 is configured to receive the message without having first requested it. Messaging client 32 is also configured to send, utilizing the first protocol, a message to job service 14—the source of the first communication. That message can include a response received from server 30.

Server 30 represents generally any combination of hardware and programming configured to receive the request from messaging client 28, process the request, and return a response to messaging client 28 using the second protocol. In processing the request, server 30 forwards the job instruction included in the request to job client 32. To generate the response, server 30 may communicate with job engine 26 or job client 32 to obtain information related to the state of job engine 26. Where device 12 is a printer, such state information can include consumable levels and usage, successful receipt of a job instruction, successful completion of a print, and any other information relative to the state of job engine 26. Server 30 can then include the state information in the response.

Job client 32 represents generally any combination of hardware and programming configured to process a job instruction received from server 30. A job instruction, for example, may be or include a reference such as an URL (Uniform Resource Locator) for use in retrieving a job from job service 14. In such a case, job client 32 is responsible for using the reference to send a communication via interface 22 utilizing the second protocol, HTTP in the above example. That communication includes a request to retrieve a rendered job identified by the reference. In response to that request, job client 32 receives the rendered job and passes it to job engine 26 for processing. Where the job is a print job, job engine 26 produces printed output. The job instruction may also include parameter settings. Here, job client 32 passes those setting to job engine 26 for use in processing the job.

Messaging client 28 communicates with job service 14 via the first protocol with communications passing over a messaging cannel. Job client 32 communicates with job service 14 via a second protocol with communications passing over a data channel that differs from the messaging channel. The first and second protocols are different in that an external communication (a communication from job service 14) can be sent to messaging client 28 without messaging client 28 having first requested that communication. A protocol such as XMPP can serve as the first protocol. On the other hand, an external communication sent from job service 14 to job client 32 is first requested by job client 32. Thus, HTTP can serve as the second protocol.

In a given implementation, a rendered job may be included in a job instruction of a message received by messaging client 28. In this case, job client 32 may not communicate with job service 14 directly, but instead extract and forward the rendered job to job engine 26. Where, for example, device 12 is a printer, the extracted job can be a print job processed to produce printed output.

Job service 14 is shown to include job manager 34, formatter 36, spooler 38, device manager 40, and messenger 42. Job manager 34 represents generally any combination of hardware and programming configured to receive data from clients 16 and 18. In general, this data defines jobs to be processed and selectively delivered to one or more of devices 12. Job manager 34 is responsible for processing data received from a client to define a job, analyze characteristics of that job and to then divide the job into sub-jobs based upon those characteristics. A sub-job is a distinct portion of a job. For example, where a print job includes fifty pages of content to be printed, each sub-job could include a distinct sub-set of those pages.

Formatter 36 represents generally any combination of hardware and programming configured to render a job into a device ready format. Where device 12 is a printer, formatter 36 renders a job into a format that can be utilized by the printer to produce printed output. Exemplary formats include PDLs (Page Description Languages) such as PCL (Printer Command Language), PS (Post Script), and PDF (Portable Document Format). In the example of FIG. 2, formatter is shown to include (n) instances. Each instance is responsible for rendering a different-sub-job. In this manner, formatter 36 can render the sub-jobs in parallel if so desired. Formatter 36 could also include a single instance responsible for rendering the sub-jobs serially.

Spooler 38 represents generally any combination of hardware and programming configured to act as a queue for rendered jobs and to release or stream rendered jobs when requested by device 12. In particular, once a first sub-job is rendered, it can be requested by and streamed to device 12. This can occur before formatter has completed rendering one or more of the other sub-jobs. As the remaining sub-jobs are rendered they can be added to the stream. In this manner, spooler 38 can start streaming the job to device 12 before the job has been completely rendered. In other words, device 12 can make a single request for the stream of the rendered first sub-job. Spooler 38 streams the rendered first sub-job and then the remaining rendered sub-jobs as they become available.

In a particular implementation, the sub-jobs have an order defined by job manager 34. For a print job, that order reflects the order in which the rendered sub-jobs are to be processed by device 12 to produce printed output. Thus, job manager 34 may associate each sub-job with an identifier reflective of that sub-job's position within the order. Spooler 38, when streaming rendered sub-jobs, can use the identifier to ensure that the sub-jobs are streamed in their intended order. Alternatively, spooler 38 may stream the rendered sub-jobs in another order and device 12 can use the identifiers to process the rendered sub-jobs in their intended order.

Messenger 40 represents generally any combination of hardware and programming configured to communicate messages to and receive messages from messaging client 28. As noted, those messages are of a first protocol that allows messenger 40 to communicate messages to messaging client 30 without having first received a request for that message. Messages sent to messaging client 28 include requests. Such requests can represent a job instruction that in turn can include a reference for retrieving a rendered job held by spooler 38. A job instruction can instead or also ask device 12 to prepare in anticipation of receiving a job. A print job may call for printing on media fed manually. In such a case, the request may inform device 12 of such allowing device 12 to alert an operator to load media like an envelope in the manual input tray.

Messenger 40 wraps the request in a message and sends that message to device 12 where it is received by messaging client 28. Such may, for example, be accomplished by wrapping the request in an XM PP message. Messenger 40 is also responsible for receiving messages back from messaging client 28. A received message may, for example, be an XMPP message wrapping a response to the original request. Such a response may include state data for device 12. Where device 12 is a printer, state data may indicate consumable levels and the current operational state of the printer, that is, whether or not the printer is in a power save mode, busy, malfunctioning, or in a ready state.

Client 16 is shown to include application 42, job service driver 44. Application 42 and job service driver 44 operate in conjunction to create and deliver job data to job service 14 for use by job service 14 to assemble and render a job to be delivered to device 12. Client 18 is shown to include browser 46 and job data 48. Here browser 46, with or without the aid of an extension, functions to upload job data 48 to job service 14. Where device 12 is a printer such job data may include a document to be rendered by job service 14 and then delivered to device 12 to be printed. In another implementation, browser may pass an URL or other network reference allowing job manager 34 to retrieve content from another source (not shown) using the URL.

Job manager 14 divides a job into sub-jobs so that a first sub-job can be rendered and streamed to device 12 avoiding a time lag that would otherwise result if formatter 36 were to render the entire job before streaming. As noted above, job manager 14 analyzes characteristics of a job and then divides the job into sub-jobs according to those characteristics. The characteristics can include the complexity of the job as well as the specific job parameters. Where the job is a print job, the characteristics can include the number of pages and data related to the number of images and their sizes included in the print job. Other characteristic of the print job can include color and resolution settings as well as the type of print media to be used.

In operation, messenger 40 communicates a message to device 12 in accordance with formatter 36 completing the rendering of a first one of the sub-jobs. In other words, messenger 40 times the communication of the message such that delivery occurs before or the delivery generally coincides with the completion of the rendering of the first sub-job by formatter 36. The communicated message can, for example, include a job instruction for use by device 12 to return a response requesting that the rendered first sub-job be streamed to device 12. For example, the message may wrap a job instruction that identifies an URL or other network reference for requesting the stream from job service 14. In this manner, the rendered first sub-job is ready for streaming upon receipt of a response from device 12—that response being a request for the stream made using the network reference included in the message.

Job manager 14 may select a size for the first sub-job that differs from the sizes selected for the other sub-jobs. Note that the first sub-job is the sub-job that, once rendered, is to be processed first by device 12 followed by the remainder of the other rendered sub-jobs. The size of the first sub-job may be selected so that completion of the rendering of the first sub-job by formatter 36 is timed to occur before or unsubstantially coincide with the receipt of the response from device 12 that includes a request for a stream of the rendered first sub-job. A twenty page print job may be divided such that the first sub-job includes four pages and the remaining two sub-jobs include eight pages each. Presumably, formatter 36 will finish rendering the first sub-job first even if all sub-jobs are rendered in parallel. Thus, messenger can send a message to device 12 allowing device 12 to request the streaming of the rendered first sub-job while one or both of the remaining sub-jobs are still being rendered. Note that the number of pages to include in a sub-job is only one factor. For example, a print job may include pages of text ending with pages filled with images. In this example, the first sub-job may include more pages than subsequent sub-jobs as text can be rendered more quickly than images in most instances.

As noted above, device 12 may not be immediately able to process a rendered job. For example, device 12 may be in a power save mode, or required consumables may not be available without operator intervention. In such cases, messenger 40 may perform its function by sending a first message to device 12 followed by a second message. The first message would include a print instruction to cause device 12 to exit a power save mode and alert an operator of any needed user intervention. The second message would include a print instruction to cause device to respond with a request to stream the rendered print job.

It is also noted that a response to a message received from device 12 can include a first response and a second response. The first response may, for example be state data wrapped in an XMPP message received by messenger 40 via the messaging channel. The second response may be a request for a rendered print job stream received by spooler 36 via the data channel.

As noted, job manager 34 assembles jobs from data received from or identified by clients 16 and 18. That data can include job parameters. After job manager 34 divides the job into sub-jobs, formatter 36 renders the sub jobs according to the job parameters. Before the job is completely produced by device, a user of client 16 or 18 may desire to alter the job parameters. With a print job, for example, a user may have originally included job parameters indicating all pages are to be printed when the user really intended to print only a subset of those pages. Likewise, a user may have specified color printing when monochrome printing was desired.

In such cases, a user, through client 16 or 18, can submit altered job parameters to job service 14. Upon receipt of the altered job parameters, job manager 14 identifies those sub-jobs that are affected. Formatter 36 then renders each affected sub-job according to the altered job parameters to create a re-rendered version of that sub-job. For rendered sub-jobs made obsolete or not needed based on the altered job parameters, spooler 34 prevents those sub-jobs from being streamed. Such can include deletion. For each originally rendered sub-job having a corresponding re-rendered version that has yet to be streamed to device 12, spooler 38 replaces that rendered sub-job with its re-rendered version. For each such rendered sub-job that has already been streamed, spooler 38 streams the re-rendered version.

As noted, job parameters can directly or indirectly identify the device to which the rendered sub-jobs are to be streamed. Altered job parameters may identify, directly or indirectly, a second, different device. Using a print job as an example, a user may mistakenly direct the job to one printer when a second printer was actually desired. The user may then, via client 16 or 18, provide job service 14 with altered job parameters directly identifying the second printer. In another example, the user may have selected monochrome printing when color printing was desired. The user can then submit altered job parameters indicating color printing to job service. Assuming the printer originally selected to produce the print job is not capable of color printing, altered job parameters indirectly identify a second printer capable of color printing.

Spooler 40 is responsible for streaming each rendered sub-job affected by the altered job parameters to that second device. If necessary, each sub-job affected by the altered parameters is re-rendered according to those altered parameters before being streamed. In operation, messenger 38 sends a message to the second device. If the sub-jobs are being re-rendered, the message is communicated in accordance with a completion of the re-rendering of a first of the affected sub-jobs. In any case, the message includes a job instruction identifying a reference for requesting the stream. The second device then uses the reference to request the stream from spooler 40.

In foregoing discussion, various components were described as combinations of hardware and programming. Such components may be implemented in a number of fashions. In one example, the programming may be processor executable instructions stored on tangible memory media and the hardware may include a processor for executing those instructions. Thus, certain elements operating on the same device may share a common processor and common memory media. Components operating on different devices, then, may utilize different processors and memory media.

Figure 3:
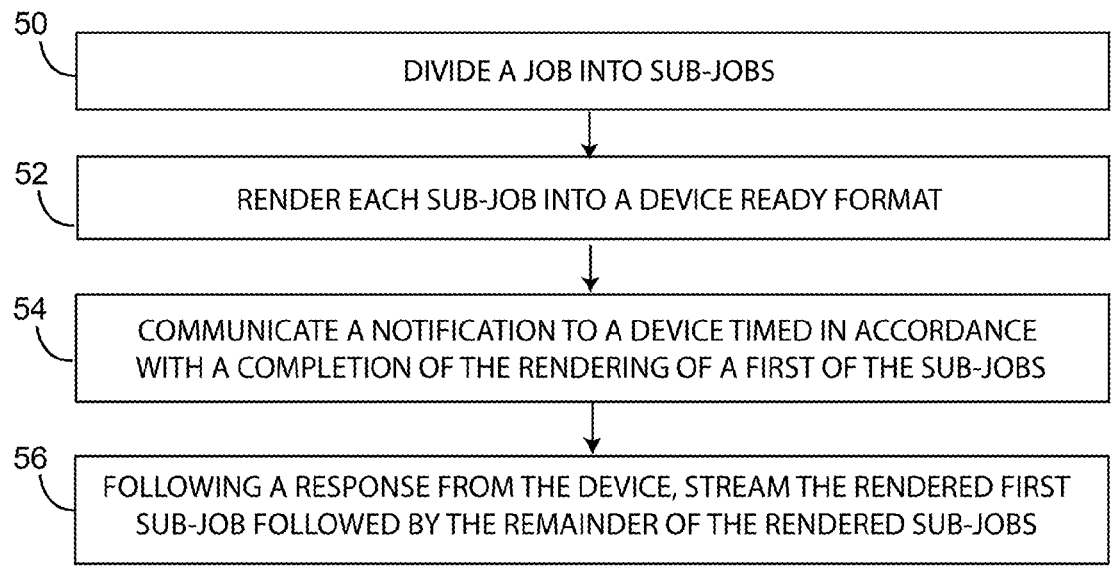
FIGS. 3-5 are exemplary flow diagrams depicting steps taken to implement various embodiments.
Figure 4:
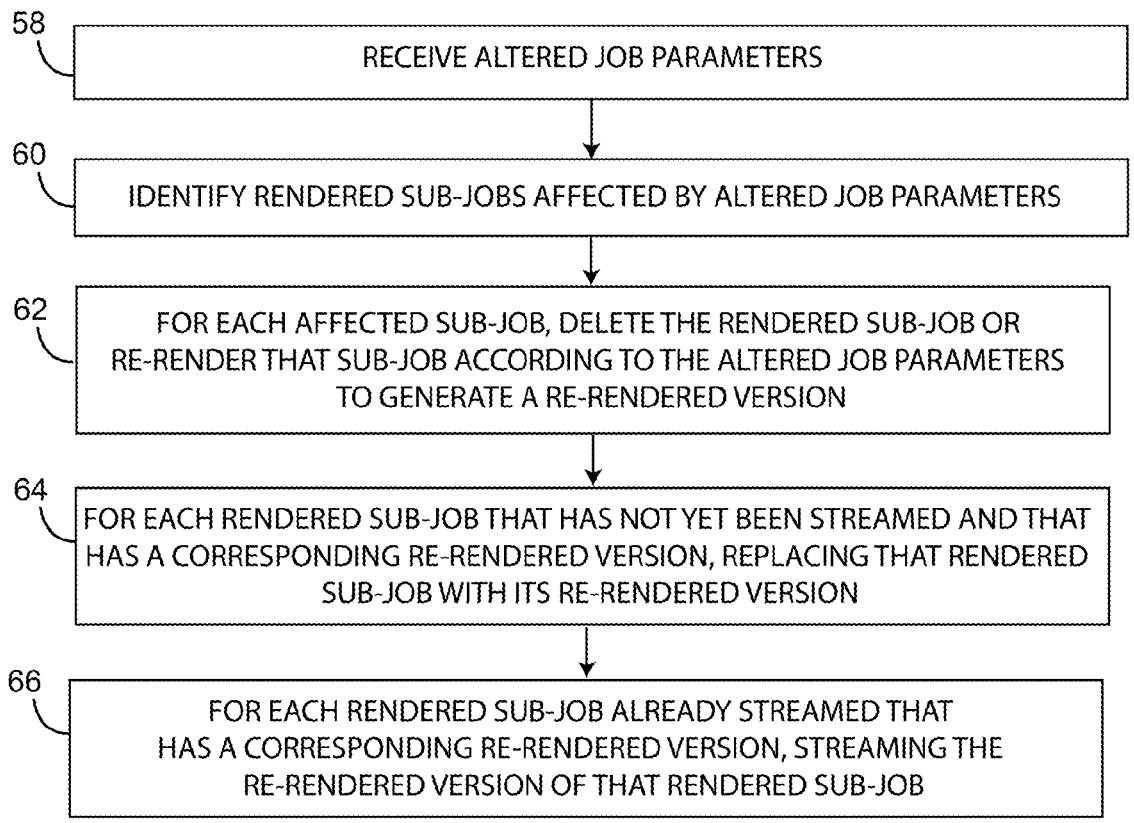
Figure 5:
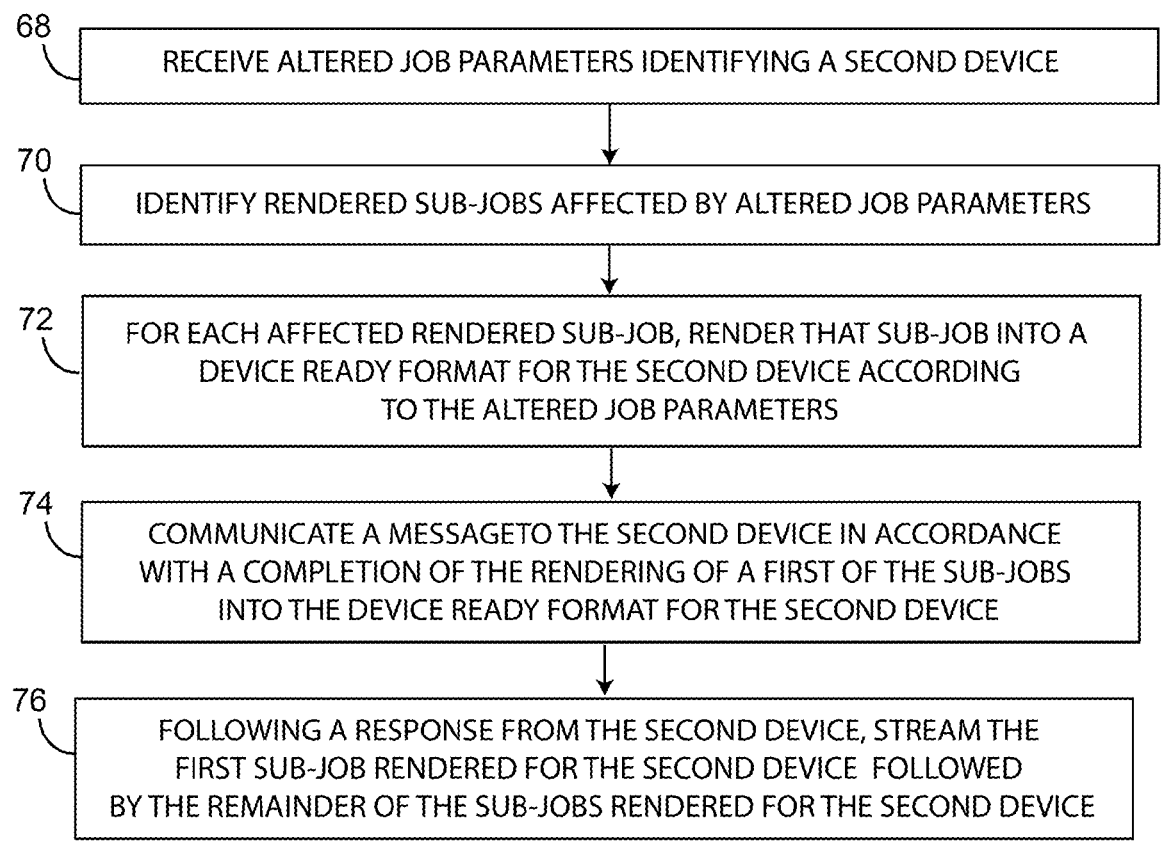

OPERATION: FIGS. 3-5 are exemplary flow diagrams of steps taken to implement various embodiments. In discussing FIGS. 3-5, reference may be made to the diagrams of FIGS. 1-2 to provide contextual examples. Implementation, however, is not limited to those examples. FIGS. 3-5 depict a workflow from the perspective of a network service such as job service 14 of FIGS. 1 and 2.

Initially a job is defined. As noted above, that job includes data that, once rendered into a device ready format, can be processed by the device to produce an output. The data includes job parameters for guiding how the job is to be rendered into a device ready format and for guiding how the device ultimately processes the rendered job. The job is divided into sub-jobs (step 50). Referring to FIG. 2, step 50 may be implemented by job manager 34. The job, for example, may be a print job having a specified number of pages. Each sub-job then would specify a different subset of those pages.

Each sub-job is rendered into a device ready format (step 52). Referring to FIG. 2, formatter 36 may be responsible for implementing step 52. In particular, each instance 36*a-n* of formatter 36 may be responsible for rendering a different one of the sub-jobs. Where the job is a print job, each sub-job is rendered into a format that can be processed by a printer to produce a printed output. Exemplary formats include PDLs (Page Description Languages) such as PCL (Printer Command Language), PS (Post Script), and PDF (Portable Document Format).

A message is communicated to a device (step 54). Delivery of the message is timed in accordance with a completion of the rendering of a first of the sub-jobs. Referring to FIG. 2, step 54 may be implemented by messenger 40. In particular, step 54 can involve timing the communication of the message such that the message is delivered before or the delivery generally coincides with the completion of the rendering of the first sub-job. The communicated message can, for example, include a job instruction for use by device 12 to return a response requesting that the rendered first sub-job be streamed to device 12.

Following receipt from the device of a response to the message, the rendered first sub-job is streamed to the device followed by the remainder of the rendered sub-jobs (step 56). Referring to FIG. 2, spooler 38 may be responsible for implementing step 56. When the job is divided in step 50, it may be divided into sub-jobs having an order selected such that, when rendered, the rendered sub-jobs are processed by the device in that order to produce the job. Streaming in step 56, then, can include streaming the rendered sub-jobs in that order or with data identifying the order. Moreover, step 56 can include streaming the rendered first sub-job prior to one or more of the remaining sub-jobs being rendered in step 52.

Step 50 may include dividing the job into sub-jobs such that a first of the sub-jobs is of a first size and a second of the sub jobs is of a second size different than the first size. The first size is selected so that completion of the rendering of the first sub-job is timed to occur before or to substantially coincide with the receipt of the response. That response includes a request for a stream of the rendered first sub-job.

Step 54 can include timing the communication of the message based upon one or more of a state of the device and a timing of the rendering of the first sub-job. In particular, step 54 can include communicating an initial message causing the device to prepare for receiving the rendered first sub-job and communicating a subsequent message causing the device to respond with a request for the rendered first sub-job. The response to the message from the device then can include a first response identifying a state of the device and a second response requesting that the rendered first sub-job be streamed.

The message communicated in step 54 may be communicated over a message channel using a first protocol, while the rendered sub-jobs are streamed in step 56 over a different data channel using a second, different protocol. The first protocol, for example, may be XMPP while the second is HTTP. Use of the first protocol, such as XMPP, allows the message to be sent to the device without the device having first requested it. Note that the terms data and messaging, as used with respect to a channel, are used only to distinguish between two different channels for communicating data. The messaging channel is used to communicate messages to a device while the data channel is used to stream data such as rendered jobs to the device.

FIGS. 4 and 5 depict processes that can occur concurrently with the process depicted in FIG. 3. As noted above, a job includes job parameters. In step 52, each sub-job is rendered into the device ready format according to those job parameters. Looking at FIG. 4, altered job parameters are received (step 58). Altered job parameters are modified job parameters for the job currently being processed. Rendered sub-jobs affected by the altered parameters are identified (step 60). For each affected rendered sub-job, that rendered sub-job is deleted or the corresponding sub-job is re-rendered according to the altered job parameters to create a re-rendered version (step 62). Each rendered sub-job yet to be streamed that has a re-rendered version is replaced with its re-rendered version (step 64). For each rendered sub-job that has already been streamed and has a re-rendered version, that re-rendered version is streamed to the device (step 66).

Using a print job as an example, altered parameters may indicate the printing of a page range rather than an entire document. Rendered sub-jobs corresponding to pages not to be printed can be deleted if not yet streamed. In another example, altered job parameters may indicate color rather than monochrome printing. All previously rendered sub-jobs are thus affected. Sub-jobs yet to be rendered using the original parameters are rendered using the altered parameters.

Sub-jobs rendered using the original parameter are re-rendered. The sub-jobs rendered using the altered parameters replace any previous versions that have yet to be streamed. Assuming only the first sub-job rendered using the original parameters has been streamed, its re-rendered version is streamed to the printer. In this fashion, a user is able to change print parameters such as color on the fly without cancelling and resubmitting a job. The user will receive the first few pages in monochrome and then the same pages in color followed by the remainder of the pages of the job. Moreover, the user will not experience the delay that would occur if the job were to be cancelled and resubmitted as a whole, and the job does not lose its place in a queue to any intervening jobs.

Moving to FIG. 5, altered parameters that identify a second device are received (step 68). The second device may be identified directly by being explicitly identified by the altered parameters. The second device may be identified indirectly as a device compatible with the altered parameters. Sub-jobs affected by the altered parameters are identified (step 70). For each affected rendered sub-job, that rendered sub-job is re-rendered into a device ready format for the second device according to the altered job parameters (step 72).

A message is communicated to the second device (step 74). Delivery of the message is timed in accordance with a completion of the rendering of a first of the sub-jobs rendered for the second device. In particular, step 74 can involve timing communication of the message such that the message is delivered before or the delivery generally coincides with the completion of the rendering of that sub-job for the second device. The communicated message can, for example, include a job instruction for use by the second device to return a response requesting that the sub-jobs rendered for the second device be streamed to the second device. Following receipt from the device of a response to the message communicated in step 74, the first sub-job rendered for the second is streamed to the second device followed by the remainder of the sub-jobs rendered for the second device (step 76).

CONCLUSION: The diagrams of FIGS. 1-2 show the architecture, functionality, and operation of various embodiments. Various components illustrated in FIG. 2 are defined at least in part as programs. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Also, the present invention can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, magnetic computer media such as hard drives, random access memory (RAM), read-only memory (ROM), erasable programmable read-only memory, compact discs, or DVDs.

Although the flow diagrams of FIG. 3-5 show specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A job processing method, comprising:
   dividing a job into sub-jobs, the job including job parameters;
   rendering each sub-job into a device ready format based on the job parameters;
   communicating a message to a device when, a first of the sub-jobs is rendered;
   following receipt, from the device, of a response to the message, streaming the rendered first sub-job followed by the remainder of the rendered sub-jobs to the device;
   receiving altered job parameters; and
   in response to receiving the altered job parameters:
      identifying rendered sub-jobs affected by the job parameters;
      for each affected sub-job, re-rendering the affected sub-job into a device ready format according to the altered job parameters;
      for each affected sub-job not yet streamed that has a corresponding re-rendered version, replacing the affected sub-job with the re-rendered version; and
      for each affected sub-job already streamed that has a corresponding re-rendered version, streaming the re-rendered version of the affected sub-job.

2. The method of claim 1, wherein dividing the job into the sub-jobs comprises dividing the first of the sub-jobs to have a first size and a second of the sub-jobs to have a second size different than the first size, the first size being selected so that rendering the first sub-job is completed before or during the receipt of the response, the response including a request to stream the rendered first sub-job.

3. The method of claim 1, wherein communicating the message to the device is timed based upon one or more of a state of the device and a timing of the rendering of the first sub-job.

4. The method of claim 1, wherein communicating the message to the device comprises communicating an initial message causing the device to prepare for receiving the rendered first sub-job and communicating a subsequent message causing the device to respond with a request to stream the rendered first sub-job.

5. The method of claim 1, wherein:
   the job is divided into sub-jobs in a selected order such that, when rendered, the rendered sub-jobs are processed by the device in the selected order to produce the job; and
   the rendered sub-jobs are streamed in the selected order or with data identifying the selected order.

6. The method of claim 1, wherein the rendered first sub-job is streamed to the device prior to a Hall completion of rendering one or more of the remaining sub-jobs.

7. The method of claim 1, wherein communicating the message to the device is performed on a messaging channel, and wherein streaming the rendered first sub-job followed by the remainder of the rendered sub-jobs to the device is performed on a data channel that is different than the messaging channel.

8. The method of claim 7, wherein the message includes data for requesting the rendered first sub-job, and wherein the response is communicated via the data channel using the data for requesting the rendered first sub-job.

9. The method of claim 7, wherein the response includes a first response communicated via the messaging channel and a second response communicated via the data channel, the first response identifying a state of the device and the second response being a request for the streaming of the rendered first sub-job.

10. The method of claim 1, wherein the device is a first device and the altered job parameters identify a second device, the method further comprising:
in response to receiving the altered job parameters streaming each re-rendered sub-job to the second device.

11. The method of claim 10,
wherein each affected sub-job is re-rendered into a device ready format for the second device according to the altered job parameters, the method further comprising:
communicating a message to the second device when a first of the re-rendered sub-jobs is re-rendered into a device ready format for the second device; and
following receipt of a response to the message from the second device, streaming the first re-rendered sub-job followed by the remainder of the re-rendered sub-jobs to the second device.

12. A job processing system, comprising:
a processor; and
one or more memory resources storing instructions that, when executed by the processor, cause the job processing system to:
divide a job into sub-jobs, the job including job parameters;
render each sub-job into a device ready format based on the job parameters;
communicate a message to a device when a first of the sub-jobs is rendered;
following receipt of a response to the message from the device, stream the rendered first sub-job followed by the remainder of the rendered sub-jobs to the device;
receive altered job parameters; and
in response to receiving the altered job parameters:
identify rendered sub-jobs affected by the job parameters;
for each affected sub-job, re-render the affected sub-job into a device ready format according to the altered job parameters;
for each affected sub-job not yet streamed that has a corresponding re-rendered version, replace the affected sub-job with the re-rendered version of the affected sub-job; and
for each affected sub-job already streamed that has a corresponding re-rendered version, stream the re-rendered version of the affected sub-job.

13. The system of claim 12, wherein communicating the message to the device is timed based upon one or more of a timing of the rendering of the first sub-job and a state of the device.

14. The system of claim 12, wherein dividing the job into sub-jobs comprises dividing a first of the sub-jobs to have a first size and a second of the sub-jobs to have a second size different than the first size, the first size being selected so that rendering of the first sub-job is timed to substantially coincide with the receipt of the response.

15. The system of claim 12, wherein communicating the message comprises communicating an initial message causing the device to prepare for receiving the rendered first sub-job and communicating a subsequent message causing the device to respond with a request for the rendered first sub-job to be streamed.

16. The system of claim 12, wherein the job is divided into sub-jobs in a selected order such that, when rendered, the rendered sub-jobs are processed by the device in the selected order to produce the job, and wherein the rendered sub-jobs are streamed in the selected order or with data identifying the selected order.

17. The system of claim 12, wherein the rendered first sub-job is streamed to the device prior to a completing rendering one or more of the remaining sub-jobs.

18. The system of claim 12, wherein communicating the message to the device is performed on a messaging channel, and wherein streaming the rendered first sub-job followed by the remainder of the rendered sub-jobs to the device is performed on a data channel that is different than the messaging channel.

19. The system of claim 18, wherein the message includes data for requesting the rendered first sub-job, and wherein the response is communicated via the data channel using the data for requesting the rendered first sub-job to be streamed.

20. The system of claim 18, wherein the response includes a first response communicated via the messaging channel and a second response communicated via the data channel, the first response identifying a state of the device and the second response being a request that the rendered first sub-job be streamed.

21. The system of claim 12, wherein the device is a first device and the altered job parameters identify a second device, and wherein the executed instructions further cause the job processing system to:
in response to receiving the altered job parameters stream each re-rendered sub-job to the second device.

22. The system of claim 21,
wherein each affected sub-job is re-rendered into a device ready format for the second device according to the altered job parameters, and wherein the executed instructions further cause the job processing system to:
communicate a message to the second device when a first of the re-rendered sub-jobs is re-rendered into a device ready format for the second device; and
following receipt of a response to the message from the second device, stream the first re-rendered sub-job followed by the remainder of the re-rendered sub-jobs the second device.

23. A printing method, comprising:
dividing a print job into sub-jobs, the print job including print job parameters;
rendering each sub-job into a printer ready format based on the print job parameters;
communicating a message to a printer when a first of the sub-jobs is rendered;
following receipt of a response to the message from the printer, streaming the rendered first sub-job followed by the remainder of the rendered sub-jobs to the printer to cause the printer to produce a corresponding printed output;
receiving altered print job parameters; and
in response to receiving the altered print job parameters:
identifying rendered sub-jobs affected by the print job parameters;
for each affected sub-job, re-rendering the affected sub-job into a printer ready format according to the altered print job parameters;

for each affected sub-job not yet streamed that has a corresponding re-rendered version, replacing the affected sub-job with the re-rendered version; and for each affected sub-job already streamed that has a corresponding re-rendered version, streaming the re-rendered version of the affected sub-job.

24. The method of claim 23, wherein communicating the message to the printer comprises communicating an initial message causing the printer to prepare for receiving the rendered first sub-job and communicating a subsequent message causing the printer to respond with a request to stream the rendered first sub-job.

25. The method of claim 23, wherein:

the print job is divided into sub-jobs in a selected order such that, when rendered, the rendered sub-jobs are processed by the printer in the selected order to produce the corresponding printed output; and the rendered sub-jobs are streamed in the selected order or with data identifying the selected order.

26. The method of claim 23, wherein the printer is a first printer and the altered job parameters identify a second printer, the method further comprising:

in response to receiving the altered print job parameters, streaming each affected sub-job to the second printer to cause the second printer to produce a print output corresponding to the affected sub-jobs.

* * * * *